Feb. 4, 1958           J. L. HOLLIS           2,822,025
METHOD AND APPARATUS FOR APPLYING A TREAD TO A TIRE BODY
Filed Dec. 17, 1954
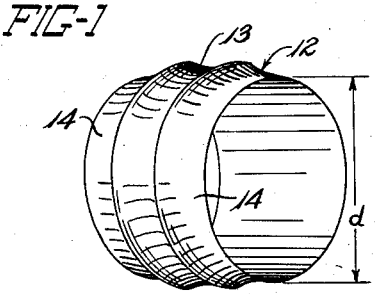
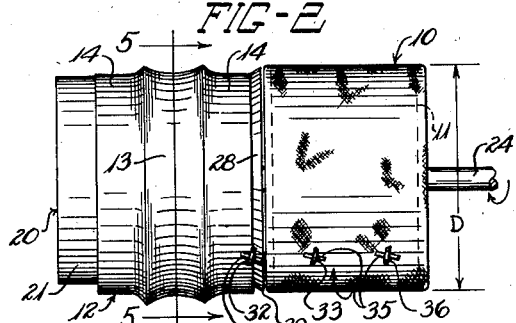
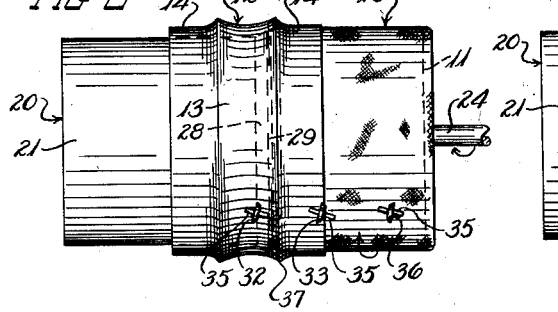
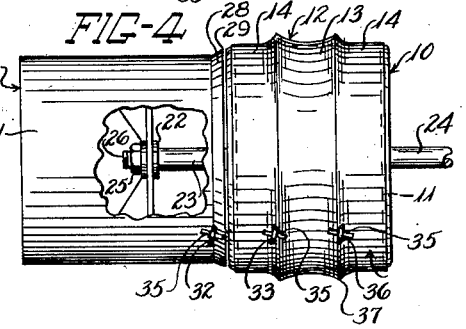
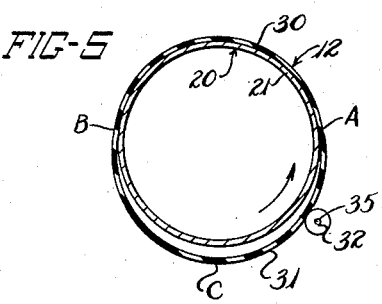
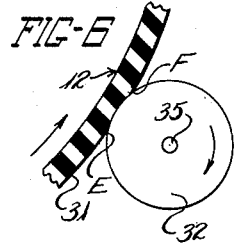
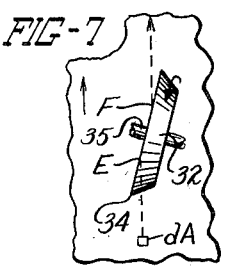
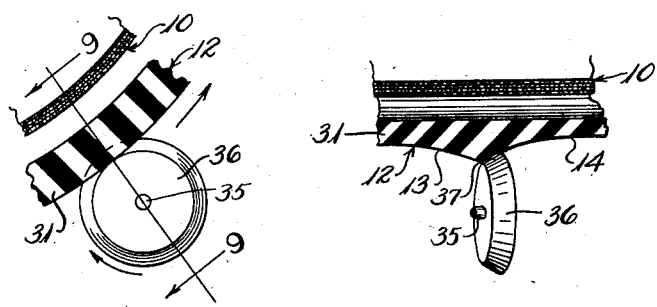
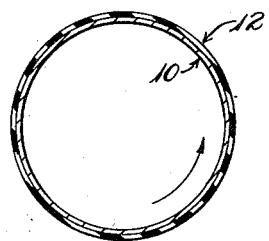
INVENTOR.
JACK L. HOLLIS
BY
W. A. Fraser
ATTY.

United States Patent Office 2,822,025
Patented Feb. 4, 1958

2,822,025

METHOD AND APPARATUS FOR APPLYING A TREAD TO A TIRE BODY

Jack L. Hollis, Akron, Ohio, assignor to The Firestone Tire & Rubber Company, Akron, Ohio, a corporation of Ohio Application December 17, 1954, Serial No. 475,946

5 Claims. (Cl. 154—9)

This invention relates to the manufacture of pneumatic tires and more particularly to an apparatus and method for assembling the tread and body portions of a tire.

As automobile suspensions have improved and automobile motors become quieter in operation, drivers have become increasingly aware, and critical, of the ride and noise characteristics of tires. Many drivers are annoyed by the so-called "thumping" tires, which produce a periodic, low-frequency vibration, a vibration which in most cases is felt but which at times is audible as well. A thumping tire will usually result from a non-uniform tread gauge, although, of course, other defects in construction have been recognized as contributing to thump. Such an off-gauge tread is due primarily to conventional methods of applying tread portions to tire bodies in which portions of the tread are stretched while other portions of the same tread are compressed upon the tire body to produce variations in tread thickness. The subsequent molding and vulcanizing operations used to finish the tire will not correct this non-uniform distribution of tread mass which is introduced by such manufacturing methods.

The conventional methods of assembling treads with tires, in addition to their lack of control over tread gauge, have other serious objections. In the production of passenger tires, such methods are time consuming and expensive; the operations are difficult and require manual strength and dexterity. It is impossible to achieve uniformity of results so far as tire performance is concerned.

The present invention obviates these difficulties in the prior methods of building tires by providing a novel and improved method of applying a tread to a tire body. In brief, the method comprises the steps of spinning a tread in the form of a closed cylinder at high speeds to cause it to stretch out elastically to a circumference slightly greater than that of the tire body, imposing axial forces upon the spinning tread to move it into a telescoping position encircling the tire body, and while the tread is accurately positioned with respect to the tire body decreasing the rate of spin thereby allowing the tread to shrink upon and become accurately and firmly assembled with the tire body.

It is accordingly a general object of the invention to provide an improved method and means for assembling a tread with the body of the tire.

A more specific object is to provide a method and means of applying a tread to a tire body comprising enlarging the tread by centrifugal force, bringing the tread into telescoping position over the body of the tire and then reducing the centrifugal force to shrink the tread uniformly on the body.

Other objects are to provide a pneumatic tire having a tread of uniform gauge, which is well-balanced, smooth running and quiet in operation.

Yet another object is to provide a tire which is substantially free from thump.

Still other objects are to provide a method of applying a tread to a tire which is virtually automatic in operation, which does not require manual skill, and which provides economies in time and labor.

These and other objects and advantages will be more fully apparent from the following description of a preferred form of the invention, reference being had to the accompanying drawing in which:

Figure 1 is a perspective view of a tread in cylindrical form ready to be applied to a tire body;

Figure 2 is a front elevation of a tire building drum and auxiliary drum assembled together and supporting a tire body and tread respectively, the assembly being shown at the beginning of the tread applying operation;

Figure 3 is a view of an apparatus of Figure 1 showing the tread in an intermediate position as it is moved axially into telescoping position over the tire body;

Figure 4 is a view of the apparatus of Figures 2 and 3 showing the tread portion in final position over the tire body, portions of the auxiliary drum being broken away to show the manner in which the auxiliary drum is secured to the tire building drum;

Figure 5 is a sectional view taken in the plane indicated by the lines 5—5 in Figure 2, showing the tread in the position it assumes at full rate of spin;

Figure 6 is a fragmentary view on an enlarged scale of a portion of Figure 5 showing the co-action between the tread and one of the idling discs which imparts axial forces to the tread;

Figure 7 is a front elevation of the parts of Figure 6 showing diagrammatically the manner in which the disc imparts axial forces and movement to the tread;

Figure 8 is a side elevation showing on an enlarged scale the manner in which the tread is centered on the tire body;

Figure 9 is a longitudinal sectional view taken in the plane indicated by the lines 9—9 of Figure 8; and Figure 10 is a view showing the tread in final position closed upon the tire body.

The present invention is described in connection with otherwise conventional tire manufacturing processes, in which a plurality of rubber plies are assembled with inextensible beads to form a substantially cylindrical tire body. Such a tire body indicated generally at 10, is shown in Figure 2 in position on a conventional building drum 11. To complete the tire, a tread such as that shown at 12 in Figure 1, is applied to the tire body and united with the body to form an integral structure ready for the final molding and vulcanizing operation. The tread 12, comprises the usual center cap portion 13, which is relatively thick in section and two end portions 14, of lesser thickness which comprise the sidewalls of the finished tire.

The tread is preferably formed in one piece by a transfer-molding operation so that it will be initially uniform in gauge and free of a spliced area. Alternatively, the tread may be formed by splicing the ends of extruded lengths of rubber having the proper cross section. In either case, the tread is roughly cylindrical in shape with its inner diameter, $d$, about an inch smaller than the outer diameter, $D$, of the tire body 10. The tread is formed from rubber stocks of conventional and well-known compositions. Such compositions impart considerable elastic properties to the tread and as a result the tread may be stretched circumferentially several inches and upon release of the stretching forces will return to its original circumferential length.

As mentioned above, such a tread is assembled upon the tire body by first spinning the tread and the tire at relatively high speeds, so that the centrifugal forces exerted upon the tread will stretch the tread to a diameter slightly exceeding that of the tire body, (the tire body being relatively inextensible under such centrifugal forces) and then applying axial forces to the temporarily enlarged tread to force it into a telescoping position about the body of the tire. The elongation of the tread under the centrifugal forces of spinning is substantially elastic, so that once the tread is properly positioned with respect to the tire body a reduction in the rate of spin will cause the tread to shrink back toward its original circumferential length and close tightly upon the tire body. By such a method every portion of the tire tread is subjected to the same centrifugal forces and the tread accordingly retains its original uniformity of gauge throughout the operation.

Apparatus for imparting the spinning and axial forces to the tread, as shown in Figure 2, comprises an auxiliary drum 20, positioned co-axial with and adjacent one end of the building drum 11. In one embodiment of the invention, the auxiliary drum comprises a cylindrical body 21, having a hub 22 which fits on an extension 23 of the driving shaft 24 of the building drum. During the building of the tire body 10, the auxiliary drum is detached from the building drum, but after the tire body is completely assembled, the auxiliary drum is secured to the building drum as by a nut 25 screwed on the threaded end 26 of the shaft. With the auxiliary drum thus secured, the two drums will rotate together at the same speed, being driven by conventional means (not shown.)

The cylindrical body 21, of the auxiliary drum preferably has a diameter enabling it to receive the tread 12 with a snug fit. It should be noted, however, that the cylindrical body of the drum terminates in an outwardly flared conical portion 28, adjacent the building drum, the outer edge 29 of which has a diameter approximately equal to that of the tire body. This flared portion 28 has a purpose and function which will be described later.

In operation, after the tire body is built and the auxiliary drum is attached to the building drum, the tread 12, is slipped over the auxiliary drum onto the cylindrical body portion 21, and is manually forced a slight distance onto the flared portion 28. This is the position of Figure 2. The two drums are then rotated in the direction indicated by the arrows in Figures 2–5, at a speed of approximately 400 R. P. M., which is about double the speed used in assembling the tire body on the building drum. As the auxiliary drum acquires this speed of rotation, the centrifugal forces exerted on the tread cause it to enlarge in circumference, so that it tends to fit loosely on the auxiliary drum, having contact only with the top portion of the drum over a limited arcuate extent, indicated at 30, see Figure 5. This area of contact which in section is bounded by the points A and B results from the combined gravitational and centrifugal forces exerted on the tread. The remainder of the tread balloons out from the drum in a free unsupported loop 31 which swings out of contact with the drum throughout the arc indicated as ACB in Figure 5. In actual practice, the looped portion 31 of the tread is spaced about ½"–1" away from the drum surface.

As the tread picks up rotational speed and enlarges under the centrifugal forces, it also tends to move axially upon the flared drum portion 28. This flared portion thus has the functions of guiding the tread from the small diameter surface 21 upon the larger tire body and of urging the tread in a direction axially toward the tire body.

At the same time the tread responds to the centrifugal forces of spin and to the influence of the drum surface 28, axial forces are applied to the exterior surfaces of the tread by means of idling, rotating discs 32 and 33, which are moved manually into position to contact the tread of the tire. The left disc 32, as viewed n Figures 2–4, is positioned adjacent the flared portion 28, of the auxiliary drum in a position to engage the right end portion of the tread and to start the tread upon its movement toward the tire body. The other disc 33 is positioned about 4" from the left end of the building drum in a position to engage the tire tread at all times after the tread has left the auxiliary drum, and moved into telescoping position over the tire body.

The discs 32 and 33 are identical in construction and in function and accordingly only disc 32 will be described in detail. The disc 32 comprises a circular body about 2½" in diameter, whose outer periphery is chamfered so that it terminates in a sharp circular edge 34. The disc 32 is rotatable about an axis 35, which is inclined at an angle of about 15° to the axis of rotation of the drums with the result that the edge 34 of the disc rotates in a plane which is inclined in the direction of the tire building drum as shown in Figures 2–4 and which makes an acute angle with every plane of rotation of the tread and tire body.

The disc 32 is positioned just in front of the point A, the juncture of the area of contact 30 between the tread and the auxiliary drum and the unsupported loop 31 of tread. It should be noted that the rotation of the tread is such that after a portion of the tread leaves the disc 32 it very quickly comes in contact with the top portion of the auxiliary drum.

The operation of the tool 32, might be best understood by a consideration of a small area $dA$, see Figure 7, on the outer surface of the tread. Such an area will be carried by the rotation of the tread into contact with the circular edge 34 of the disc at a point indicated at E. The disc edge bites into the tread and is induced to rotate with the tread. The rotation of the disc will tend to carry the area $dA$, along the edge of the disc until the area $dA$ leaves the disc edge at a point indicated at F, see Figure 7.

Thus as each element of the tread comes in contact with a disc, it will cause the disc to turn and will at the same time tend to be carried along the edge of the disc thereby picking up a component of motion in the axial direction. Each element of the tread after it leaves the disc 32 (or 33) has thus had imparted to it a permanent increment of motion toward the tire body. The net result of the influence of the idling discs is an axial movement of the tread bodily toward the tire body with each revolution of the tread.

As noted above, the placing of the discs 32 and 33 with respect to the loop 31 of the spinning tread is important. Preferably each disc is placed to contact the free loop of the tread a short distance before the tread reaches the area of contact between the tread and the drum or between the tread and the tire body after the tread has moved about the tire body. It has been observed that if a disc is placed on the opposite side of the tread in a position immediately following point B, i. e. the point where the tread begins to loop out from contact with the drum, the disc tends to impart only an elastic wrinkle to the tread, without imparting any substantial, permanent, axial movement to the tread. This is because an element of the tread, after it rides axially along a disc, will have virtually the entire free loop 31 to come back to its original plane of revolution. In contrast, with the disc position shown in Figure 5, an element of the tread will be brought into contact with the drum almost immediately after leaving the roller and hence the element will not have sufficient time to return to its original plane of rotation. As soon as an element contacts the drum, frictional contact with the drum will retain the element in its axially advanced position.

It will be observed, too, that for best results the discs contact the free loop of the tread and not the tread portion 30 at the top of the tread where it contacts the drum or tire body, for in this position the discs cannot effectively move the tread axially against the frictional forces existing between the tread and the drum and tire body.

The two discs 32 and 33 will drive the tread into telescoping position over the tire body until the edge 37 of the cap portion 13 strikes the positioning disc 36, which is set close enough to the tire body to prevent the rib 37 from passing beneath it. The roller 36 thus provides a stop to locate the tread in the desired position on the tire body. As soon as the tread reaches this position the rotational speed of the tire body is reduced, permitting the tread to shrink in place upon the body of the tire. It should be noted that the disc 36 is tilted at an angle to the axis of the tread so that its reaction with the tread will cause the edge 37 of the tread to remain snugly in contact with the disc 36. In this manner, correct positioning of the tread is insured.

The discs 32, 33 and 36 are mounted in brackets of any suitable design so that they may be individually moved into operative position against the tread and removed from operative position by simple manual manipulation. The details of such mounting obviously form no part of the present invention. It should be noted moreover that the movement of the discs into operative contact with the tread may be performed automatically by suitable control mechanism.

It is also possible to mount a disc in a suitable handle so that it may be aplied manually to the spinning tread. If such a disc is held in contact with the tread and then moved axially toward the drum, the reaction between the disc and the tread will move the tread into proper telescoping position over the tire body. When a disc is used in this manner the disc may be applied to the tread either with its axis inclined at an angle to a plane of revolution of the tread or positioned parallel to such a plane.

Various modifications and changes in the method and apparatus of the present invention may be made without departing from the spirit and scope of the invention, the essential features of which are summarized in the appended claims.

I claim:

1. The method of applying a pre-shaped tread of elastic material to a tire body in an indexed position, said tread being substantially cylindrical in form and having an inside diameter smaller than the outside diameter of said tire body, comprising the steps of positioning said body and said tread coaxially with one end of said tread adjacent one end of said body, spinning said tread and said body about the common axis at a rate of spin sufficient to impart circumferential elastic elongation to said tread until the inner diameter of said spinning tread is slightly larger than the outer diameter of said body, supporting said tread over a limited arcuate circumferential portion of its peripheral inner surface while allowing the remainder of said tread to form an unsupported loop, applying axial force to the outer surface of said tread while said tread still is spinning to telescope said tread over said body, applying an equal and opposite axial force to the outer peripheral surface of said tread in response to the arrival of said tread in the indexed position with respect to said body, and contracting said tread circumferentially upon said body, whereby the inner surface of said tread is adhered to the outer surface of said body.

2. The method of applying a pre-shaped tread of elastic material to a tire body in an indexed position, said tread being substantially cylindrical in form and having an inside diameter smaller than the outside diameter of said tire body, comprising the steps of positioning said body and said tread coaxially with one end of said tread adjacent one end of said body, spinning said tread and said body about the common axis at a rate of spin sufficient to impart circumferential elastic elongation to said tread until the inner diameter of said spinning tread is slightly larger than the outer diameter of said body, supporting said tread over a limited arcuate circumferential portion of its peripheral inner surface while allowing the remainder of said tread to form an unsupported loop, applying axial force to the outer surface of said tread while said tread still is spinning to telescope said tread over said body, applying a force having an axial component equal and opposite to said first axial force to the outer peripheral surface of said tread in response to the arrival of said tread in the indexed position with respect to said body, and reducing the rate of spin of said tread and said body to permit said tread to contract circumferentially upon said body, whereby the inner surface of said tread is adhered to the outer surface of said body.

3. The method of applying a pre-shaped tread of elastic material to a tire body in an indexed position, said tread being substantially cylindrical in form and having an inside diameter smaller than the outside diameter of said tire body, comprising the steps of positioning said body and said tread coaxially with one of said tread adjacent one end of said body, spinning said tread and said body about the common axis at a rate of spin sufficient to impart circumferential elastic elongation to said tread until the inner diameter of said spinning tread is slightly larger than the outer diameter of said body, supporting said tread over a limited arcuate circumferential portion of its peripheral inner surface while allowing the remainder of said tread to form an unsupported loop, applying axial force to the outer surface of said tread while said tread still is spinning to telescope said tread over said body, applying an equal and opposite axial force to the outer peripheral surface of said tread in response to the arrival of said tread in the indexed position with respect to said body, and reducing the rate of spin of said tread and said body to permit said tread to contract circumferentially upon said body, whereby the inner surface of said tread is adhered to the outer surface of said body.

4. Apparatus for applying an endless cylindrical pre-shaped tread having circumferential raised portions on its outer peripheral surface and spaced from the edges thereof to an indexed position on the cylindrical body of a tire, said apparatus comprising a substantially cylindrical main drum adapted to support said tire body internally and to rotate said body about its axis, an auxiliary drum adapted to support said tread internally and to rotate said tread about an axis substantially aligned with the axis of said tire body, means to drive said drums whereby to rotate said tire body and said tread, means adapted to contact the outer peripheral surface of said tread while said tread and body are rotating and to impart axial motion to said tread, whereby to telescope said tread into indexed position over said body, and means responsive to contact said raised portion of said pre-shaped tread in said indexed position and adapted to terminate said axial motion at said position, said last named means comprising a rotatable disc mounted in spaced relation to said body to allow limited axial movement of said tread between said disc and said body, said disc having a beveled surface facing the oncoming tread and adapted to engage said raised portion of said tread to stop axial movement thereof at said indexed position.

5. Apparatus for applying an endless cylindrical pre-shaped tread having circumferential raised portions on its outer peripheral surface and spaced from the edges thereof to an indexed position on the cylindrical body of a tire, said apparatus comprising a substantially cylindrical main drum adapted to support said tire body internally and to rotate said body about its axis, an auxiliary drum adapted to support said tread internally and to rotate said tread about an axis substantially aligned with the axis of said tire body, means to drive said drums whereby to rotate said tire body and said tread, means positioned below the horizontal plane of the axis of rotation of said drums and adapted to contact the outer peripheral surface of said tread while said tread and body are rotating and to impart axial motion to said tread, whereby to telescope said tread into indexed position over said body, and means responsive to contact said raised portion of said preshaped tread in said indexed position and adapted to terminate said axial motion at said position, said last named means comprising a rotatable disc mounted in spaced relation to said body to allow limited axial movement of said tread between said disc and said body, said disc having a relatively sharp circular edge and having a beveled surface facing the oncoming tread and adapted to engage said raised portion of said tread to stop axial movement thereof at said indexed position.

References Cited in the file of this patent

UNITED STATES PATENTS

| | | |
|---|---|---|
| 2,517,889 | Kuffler | Aug. 8, 1950 |
| 2,521,143 | Benson | Sept. 5, 1950 |